United States Patent
Jain et al.

(10) Patent No.: US 12,436,696 B2
(45) Date of Patent: Oct. 7, 2025

(54) ON-DEMAND REGULATION OF MEMORY BANDWIDTH UTILIZATION TO SERVICE REQUIREMENTS OF DISPLAY

(71) Applicants: Advanced Micro Devices, Inc., Santa Clara, CA (US); ATI Technologies ULC, Markham (CA)

(72) Inventors: Ashish Jain, Austin, TX (US); Shang Yang, Markham (CA); Jun Lei, Markham (CA); Gia Tung Phan, Markham (CA); Oswin Hall, Markham (CA); Benjamin Tsien, Santa Clara, CA (US); Narendra Kamat, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/936,809

(22) Filed: Sep. 29, 2022

(65) Prior Publication Data
US 2024/0111442 A1     Apr. 4, 2024

(51) Int. Cl.
*G06F 3/06*     (2006.01)

(52) U.S. Cl.
CPC .......... *G06F 3/0634* (2013.01); *G06F 3/0604* (2013.01); *G06F 3/0653* (2013.01); *G06F 3/0679* (2013.01)

(58) Field of Classification Search
CPC .... G06F 3/0634; G06F 3/0604; G06F 3/0653; G06F 3/0679
See application file for complete search history.

(56) References Cited

U.S. PATENT DOCUMENTS

| 10,048,741 | B1 | 8/2018 | Shahneous Bari et al. |
| 10,601,723 | B2 | 3/2020 | Smith et al. |
| 11,699,408 | B2 * | 7/2023 | Rahman ................. G09G 5/001 345/204 |
| 11,709,711 | B2 * | 7/2023 | Krishnan .............. G06F 9/5016 718/104 |

(Continued)

OTHER PUBLICATIONS

International Search Report and Written Opinion in International Patent Application No. PCT/US2023/073925, mailed Dec. 19, 2023, 13 pages.

*Primary Examiner* — Tim T Vo
*Assistant Examiner* — Richard B Franklin
(74) *Attorney, Agent, or Firm* — Kowert, Hood, Munyon, Rankin & Goetzel, P.C.; Rory D. Rankin

(57) ABSTRACT

Systems, apparatuses, and methods for prefetching data by a display controller. From time to time, a performance-state change of a memory are performed. During such changes, a memory clock frequency is changed for a memory subsystem storing frame buffer(s) used to drive pixels to a display device. During the performance-state change, memory accesses may be temporarily blocked. To sustain a desired quality of service for the display, a display controller is configured to prefetch data in advance of the performance-state change. In order to ensure the display controller has sufficient memory bandwidth to accomplish the prefetch, bandwidth reduction circuitry in clients of the system are configured to temporarily reduce memory bandwidth of corresponding clients.

20 Claims, 4 Drawing Sheets

(56) References Cited

U.S. PATENT DOCUMENTS

| | | | |
|---|---|---|---|
| 11,783,799 B2* | 10/2023 | Cheng | G09G 5/363 |
| | | | 345/531 |
| 12,153,485 B2 | 11/2024 | Shek et al. | |
| 2015/0248741 A1 | 9/2015 | Iranli et al. | |
| 2020/0257627 A1 | 8/2020 | Chamarty et al. | |
| 2024/0103754 A1* | 3/2024 | Phan | G06F 3/0653 |

* cited by examiner

ON-DEMAND REGULATION OF MEMORY BANDWIDTH UTILIZATION TO SERVICE REQUIREMENTS OF DISPLAY

BACKGROUND

Description of the Related Art

Many types of computer systems include display devices to display images, video streams, and data. Accordingly, these systems typically include functionality for generating and/or manipulating images and video information. Typically, in digital imaging, the smallest item of information in an image is called a "picture element" and more generally referred to as a "pixel."

Some systems include multiple separate displays. In these systems, multiple-display technology enables a single graphics processing unit (GPU) (or other device such as an accelerated processing circuit (APU) or other type of system on chip (SOC) or any application-specific integrated circuit (ASIC) with a display controller) to simultaneously support multiple independent display outputs. In one example, a computing system may independently connect multiple high-resolution displays into a large integrated display surface to provide an expanded visual workspace. Gaming, entertainment, medical, audio and video editing, business and other applications may take advantage of the expanded visual workspace and increase multitasking opportunities.

For one or more supported displays, a video subsystem maintains a respective frame buffer that stores data, such as one or more video frames, which may be stored in dynamic random access memory (DRAM). For each supported display, a video controller reads data via a given one of one or more DRAM interfaces for access to a respective frame buffer. A memory clock is typically used to control a data rate for accessing the frame buffer within the DRAM. In some cases, in order to provide a physical connection for transmitting the pixel bitstream from the frame buffer to a display device, a computer is connected directly to the display device through an interface such as DisplayPort (DP), embedded DisplayPort (eDP), high-definition multimedia interface (HDMI), or other type of interface. In one implementation, the bandwidth limitations for the video stream sent from the computer to the display device would be the maximum bit rate of the DisplayPort, embedded DisplayPort, or HDMI cable.

In a scenario where multiple workloads (e.g., game rendering, video processing) are accessing the memory subsystem, the memory subsystem can be set to a relatively high frequency (e.g., its maximum possible frequency) to ensure the operating frequency of the memory subsystem can process large numbers of reads and writes. In some cases, when the memory subsystem is not being overly stressed, the system may desire to reduce the memory clock frequency in order to reduce power consumption. Changing the memory clock frequency may require a training session to be performed on the memory interface, a configuration/mode change, or another action that requires access to the memory to be temporarily stopped. Stopping all memory accesses may be referred to as a "blackout period." Due to this blackout period when the memory interface needs to be retrained or when other types of mode changes need to be performed, it can difficult or impossible to find a convenient time to halt all memory access without introducing visual artifacts on any of the displays. One solution to this problem is for the display controller to prefetch sufficient data to account for the temporary halt in memory accesses. This may, for example, require the display controller to temporarily double its memory bandwidth. One way to ensure this increased memory bandwidth is available to the display controller is to statically allocate this amount of memory bandwidth to the display controller. However, this approach reduces bandwidth available to other clients, even though the display controller does not always need the increased amount of bandwidth. Consequently, improved systems and methods for managing memory bandwidth are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for prefetching data by a display controller in a computing system are disclosed. From time to time, a performance-state change of a memory are performed. During such changes, a memory clock frequency is changed for a memory subsystem storing frame buffer(s) used to drive pixels to a display device. During the performance-state change, memory accesses may be temporarily blocked. To sustain a desired quality of service for the display, a display controller is configured to prefetch data in advance of the performance-state change. In order to ensure the display controller has sufficient memory bandwidth to accomplish the prefetch, bandwidth reduction circuitry in clients of the system are configured to temporarily reduce memory bandwidth available or otherwise consumed by corresponding clients. By reducing the memory accesses generated by other clients, the other clients are prevented from competing with the display controller for memory bandwidth which may cause the display controller to fail to meet a desired quality of service requirement.

Figure 1:
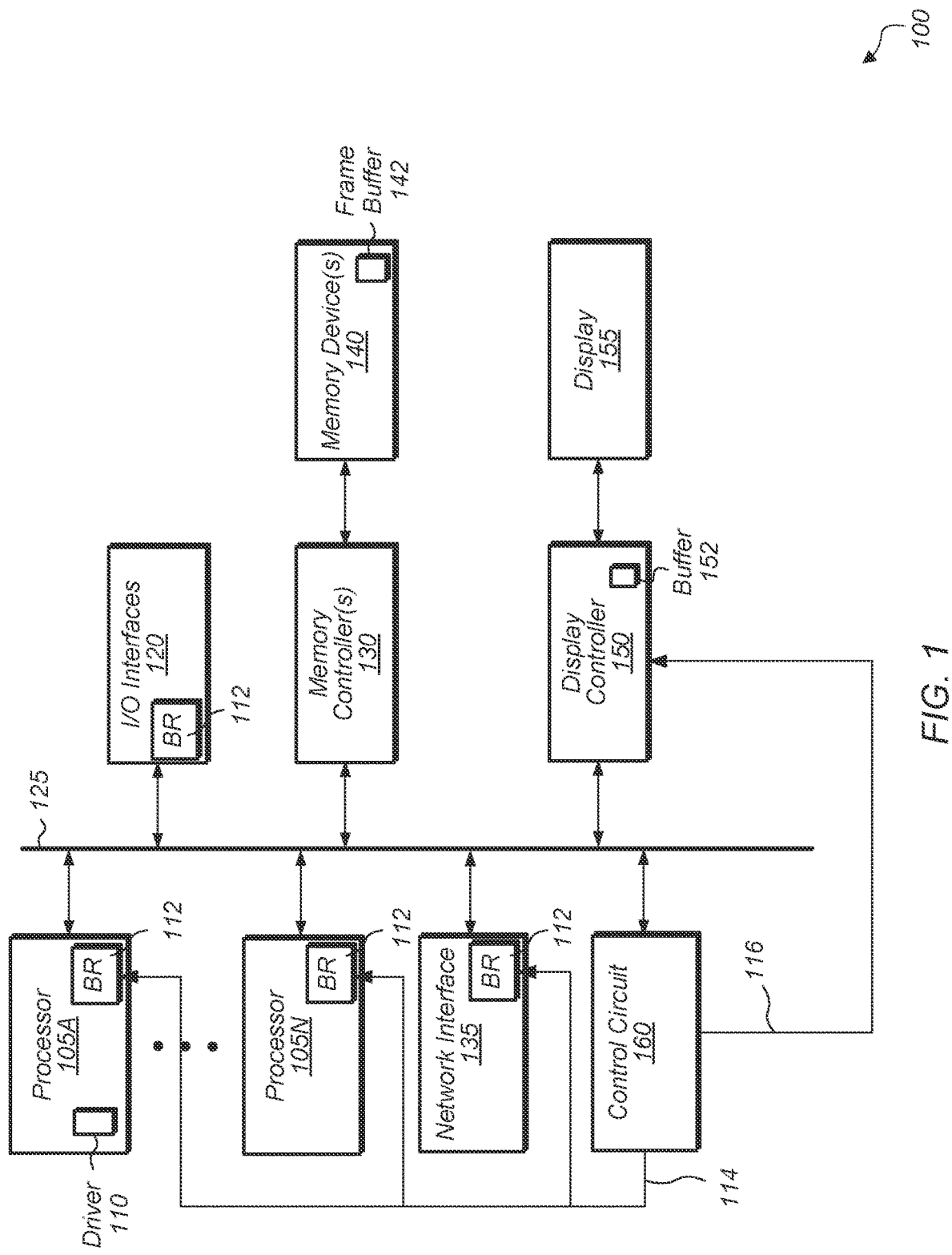
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, display 155, and control circuit 160. In other implementations, computing system 100 includes other components and/or computing system 100 is arranged differently.

Display controller 150 is representative of any number of display controllers which are included in system 100, with the number varying according to the implementation. Display controller 150 is configured to drive a corresponding display 155, with displays 155 representative of any number of displays. In some implementations, a single display controller drives multiple displays. As shown in the example, display controller 150 includes buffer 152 for storing frame data to be displayed.

In one implementation, control circuit 160 determines if condition(s) for performing a power-state change (also referred to as a "Pstate" change) have been detected. In various implementations, a change in Pstate causes a change in operating frequency and/or power consumption of a given device. For example, an increase in Pstate may entail an increase in operating frequency and voltage provided to a device. Conversely, a decrease in Pstate may entail a decrease in operating frequency and/or voltage supplied to the device.

When conditions for performing a power-state change of the memory device(s) 140 is detected, control circuit 160 determines when to implement the power-state change. Prior to implementing the power-state change, the control circuit 160 is configured to convey a signal 116 to display controller 150. In response to the signal 116, the display controller 150 is configured to prefetch additional data into a buffer 152 in anticipation of the upcoming memory blackout period (i.e., the period during memory accesses are not permitted). This will prevent interrupts in the display data that may result in visual artifacts, etc. As such, the display controller's memory bandwidth requirement temporarily increases. While causing the display controller 150 to prefetch additional data from the memory 140, sufficient bandwidth may not be available due to the many other clients that generate memory accesses (e.g., processors 105, I/O 120, etc.). In other words, the display controller 150 may require a bandwidth of X in order to complete the prefetch. However, other clients in the system may be allocated various amounts of memory bandwidth such that X bandwidth is not available to the display controller 150. Therefore, in order to ensure sufficient bandwidth is available to the display controller 150, bandwidth regulation circuits 112 are implemented (shown as BR 112 in FIG. 1) for one or more clients that are configured to generate memory accesses. Control circuit 160 is configured to convey a signal/indication 114 to each of these bandwidth regulation circuits. Responsive to the indication, the bandwidth regulation circuit causes the corresponding client to temporarily reduce its memory bandwidth during the time that the display controller 150 has its bandwidth increased.

Bandwidth regulation circuits 112 comprise circuitry configured to cause a corresponding client to reduce memory accesses conveyed to memory 140. In some implementations, a bandwidth regulation circuit is configured to cause one corresponding client to reduce memory bandwidth. In other implementations, a bandwidth regulation circuit 112 is configured to cause more than one client to reduce memory bandwidth. In some implementations, bandwidth regulating circuitry is part of the circuitry of a client and in other implementations, the bandwidth regulations circuitry is implemented separately from a given client. These and other implementations are possible and are contemplated. In this manner, the display controller is provided sufficient bandwidth to prefetch the additional data.

In one implementation, the power-state change involves adjusting the memory clock frequency of one or more memory devices 140. Control circuit 160 can be implemented using any suitable combination of circuitry, memory elements, and program instructions. It is noted that control circuit 160 can also be referred to by other names, such as a system management controller, system management circuit, system controller, controller, and so on. While a single control circuit 160 is shown in FIG. 1, it should be understood that this is merely representative of one implementation. In other implementations, system 100 can include multiple control circuits 160 located in any suitable locations. Also, in another implementation, control circuit 160 is implemented by one of processor 105A-N.

Processors 105A-N are representative of any number of processors which are included in system 100. In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware.

In one implementation, processor 105N is a data parallel processor with a highly parallel architecture. Data parallel processors include graphics processing circuits (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which renders pixel data into frame buffer 142 representing an image. This pixel data is then provided to display controller 150 to be driven to display 155.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), Graphics Double Data Rate (GDDR) Synchronous DRAM (SDRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, more or fewer of each component than are shown in FIG. 1 are present. It is also noted that in other implementations, computing system 100 includes other components (e.g., phase-locked loops, voltage regulators) not shown in FIG. 1 to avoid cluttering the figure. Additionally, in other implementations, computing system 100 is structured in other ways than shown in FIG. 1.

Figure 2:
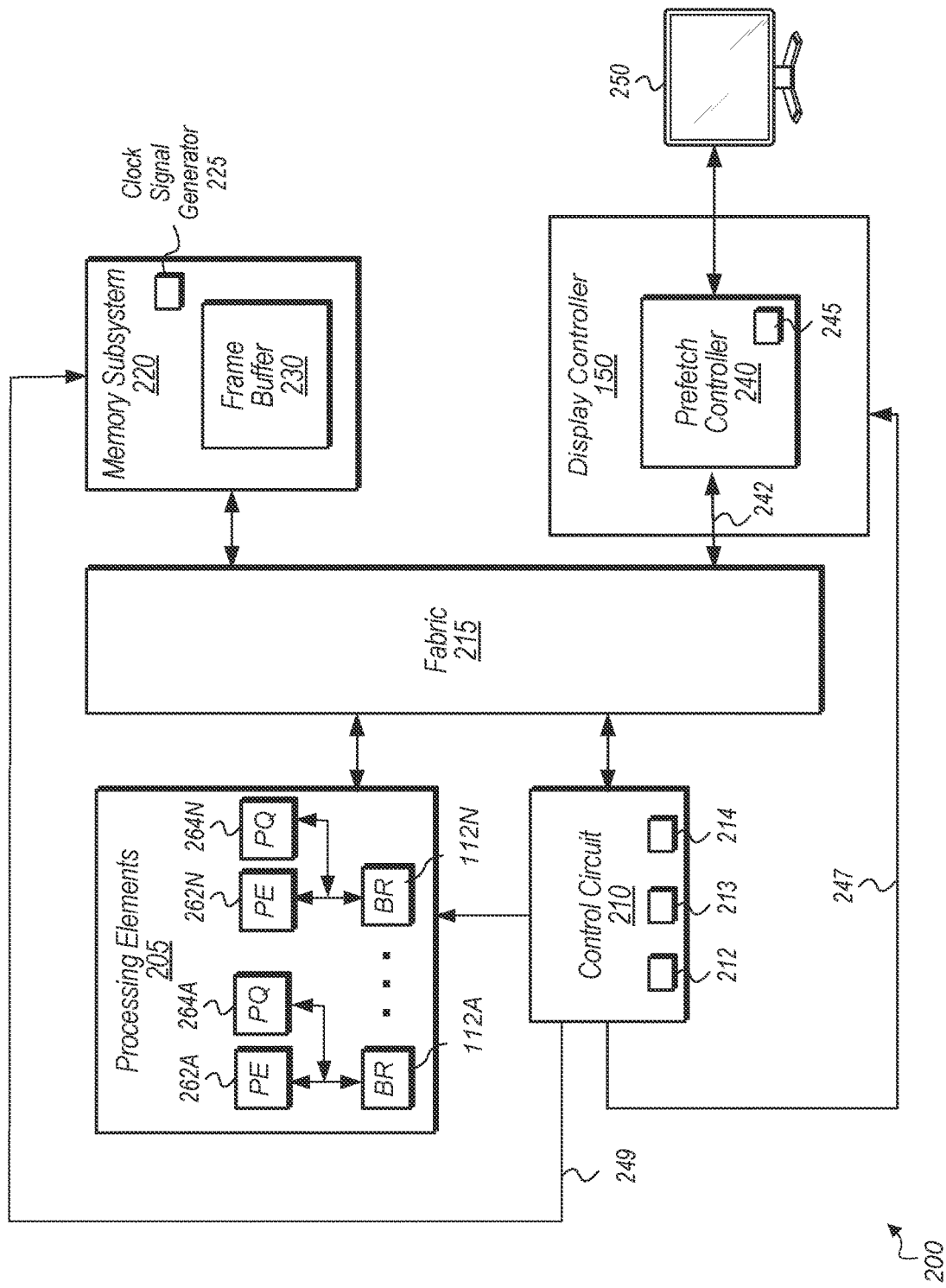
FIG. 2 is a block diagram of one implementation of a computing system.

Turning now to FIG. 2, a block diagram of one implementation of a system 200 is shown. In one implementation, system 200 includes processing elements 205, control circuit 210, fabric 215, memory subsystem 220, display controller 150, prefetch controller 240, and display device 250. While prefetch controller 240 is shown as being included in display controller 150, this does not preclude prefetch controller 240 from being integrated within display devices 250. In other words, prefetch controller 240 can be located internally or externally to display devices 250, depending on the implementation. Similarly, while buffer 245 is shown as being located within prefetch controller 240, this does not preclude buffer 245 from being located externally to prefetch controller 240 in other implementations. Generally speaking, display controller 150 receives video image and frame data from various sources, processes the data, and then sends the data out in a format that is compatible with a target display.

Processing elements 205 are representative of any number, type, and arrangement of processing resources (e.g., CPU, GPU, FPGA, ASIC). As was illustrated in FIG. 1, bandwidth regulation circuits 112A-112N are associated with processing elements 205 that generate memory accesses. In the example, each bandwidth regulation circuit 112A-112N is associated with a corresponding processing element (PE) 262A-262N. IN addition, queues 262A-262N are associated with each processing element 262 that are configured to store pending memory accesses generated by the processing elements 262. In various implementations, bandwidth regulation circuits 112 are configured to control either or both of generation of memory accesses by processing elements 262 and servicing of already generated memory accesses the are stored in pending queues 264A-264N. It is noted that a wide variety of possible arrangements of processing elements 262 and queues 264 are possible and are contemplated. Control circuit 210 includes any suitable combination of execution circuits, circuitry, memory, and program instructions. While control circuit 210 is shown as a separate component from processing elements 205, this is representative of one particular implementation. In another implementation, the functionality of control circuit 210 is performed, at least in part, by processing elements 205. Fabric 215 is representative of any number and type of buses, communication devices/interfaces, interconnects, and other interface modules for connecting the various components of system 200 together.

In one implementation, processing elements 205 generate pixel data for display on display device 250. This pixel data is written to frame buffer 230 in memory 220 by processing elements 205 and then driven to display device 250 from frame buffer 230 in one implementation. The pixel data stored in frame buffer 230 represents frames of a video sequence in one implementation. In another implementation, the pixel data stored in frame buffer 230 represents the screen content of a laptop or desktop personal computer (PC). In a further implementation, the pixel data stored in frame buffer 230 represents the screen content of a mobile device (e.g., smartphone, tablet).

Memory subsystem 220 includes any number and type of memory controllers and memory devices. In one implementation, memory subsystem 220 is capable of operating at various different clock frequencies which can be adjusted according to various operating conditions. However, when a memory clock frequency change is implemented, memory training is typically performed to modify various parameters, adjust the characteristics of the signals generated for the transfer of data, and so on. For example, the phase, the delay, and/or the voltage level of various memory interface signals are tested and adjusted during memory training. Various signal transmissions may be conducted between a memory controller and memory in order to train these memory interface signals. During this training, memory accesses are generally halted. Finding an appropriate time to perform this memory training when modifying a memory clock frequency can be challenging.

In one implementation, control circuit 210 is configured to cause performance-state changes to memory subsystem 220. When a performance-state change is to be performed, control circuit 210 causes the display controller 150 to initiate a prefetch of display data from the memory 220 in advance of the performance-state change. When the performance state of the memory 220 is changed, this causes memory training to be performed which temporarily blocks accesses to the memory 220. By causing the display controller 150 to prefetch display data (via prefetch controller 240), the display controller will not be deprived of video data during the training period. The prefetched data (e.g., pixel data) is stored in buffer 245 of prefetch controller 240 and driven to display device 250.

In one implementation, control circuit 210 includes memory bandwidth monitors 212, tracking circuit 213, and frequency adjustment circuit 214. The memory bandwidth monitors 212, tracking circuit 213, and frequency adjustment circuit 214 can be implemented using any combination of circuitry, execution circuits, and program instructions. Also, in another implementation, memory bandwidth monitor 212, tracking circuit 213, and frequency adjustment circuit 214 are individual circuits that are separate from control circuit 210 rather than being part of control circuit 210. In other implementations, control circuit 210 can include other arrangements of components that perform similar functionality as memory bandwidth monitor 212, tracking circuit 213, and frequency adjustment circuit 214.

In one implementation, memory bandwidth monitor 212 compares real-time memory bandwidth demand of memory subsystem 220 to the memory bandwidth available with the current memory clock frequency. If the memory bandwidth available with a current memory clock frequency differs from the real-time memory bandwidth demand by more than a threshold, then control circuit 210 changes the frequencies of one or more clocks of memory subsystem 220.

In one implementation, control circuit 210 sends a signal to prefetch controller 240 over sideband interface 247. It is noted that sideband interface 247 is separate from the main interface 242 used for passing pixels to prefetch controller 240. In one implementation, the main interface 242 is an embedded display port (eDP) interface. In other implementations, the main interface 242 is compatible with any of various other protocols. Sending the signal over sideband interface 247 allows the timing and scheduling of prefetch to occur in a relatively short period of time. This is in contrast to the traditional method of sending a request over the main interface 242 which can result in a lag of several frames. Also shown in FIG. 2 is a signal 249 conveyed by control circuit 210 to memory subsystem 220 configured to cause the memory subsystem to change its current Pstate.

Once prefetch controller 240 has completed prefetch of data from the memory 220, frequency adjustment circuit 214 generates a command to program clock signal generator 225 to generate the memory clock at a different frequency. In other implementations, control circuit 210 includes other arrangements of logic and/or circuits to cause an adjustment to be made to the memory clock frequency. As used herein, the terms "logic" and "unit" refer to circuits or circuitry configured to perform the described functions. For example, in another implementation, tracking circuit 213 and frequency adjustment circuit 214 are combined together into a single circuit. Other arrangements of circuitry, processing elements, execution circuits, interface circuits, program instructions, and other components for implementing the functionality of control circuit 210 are possible and are contemplated.

System 200 can be any of various types of computing systems. For example, in one implementation, system 200 includes a laptop connected to an external display. In this implementation, display device 250 is the internal display of the laptop while display device 270 is the external display. In another implementation, system 200 includes a mobile device connected to an external display. In this implementation, display device 250 is the internal display of the mobile device while display device 270 is the external display. Other scenarios employing the components of system 200 to implement the techniques described herein are possible and are contemplated.

Figure 3:
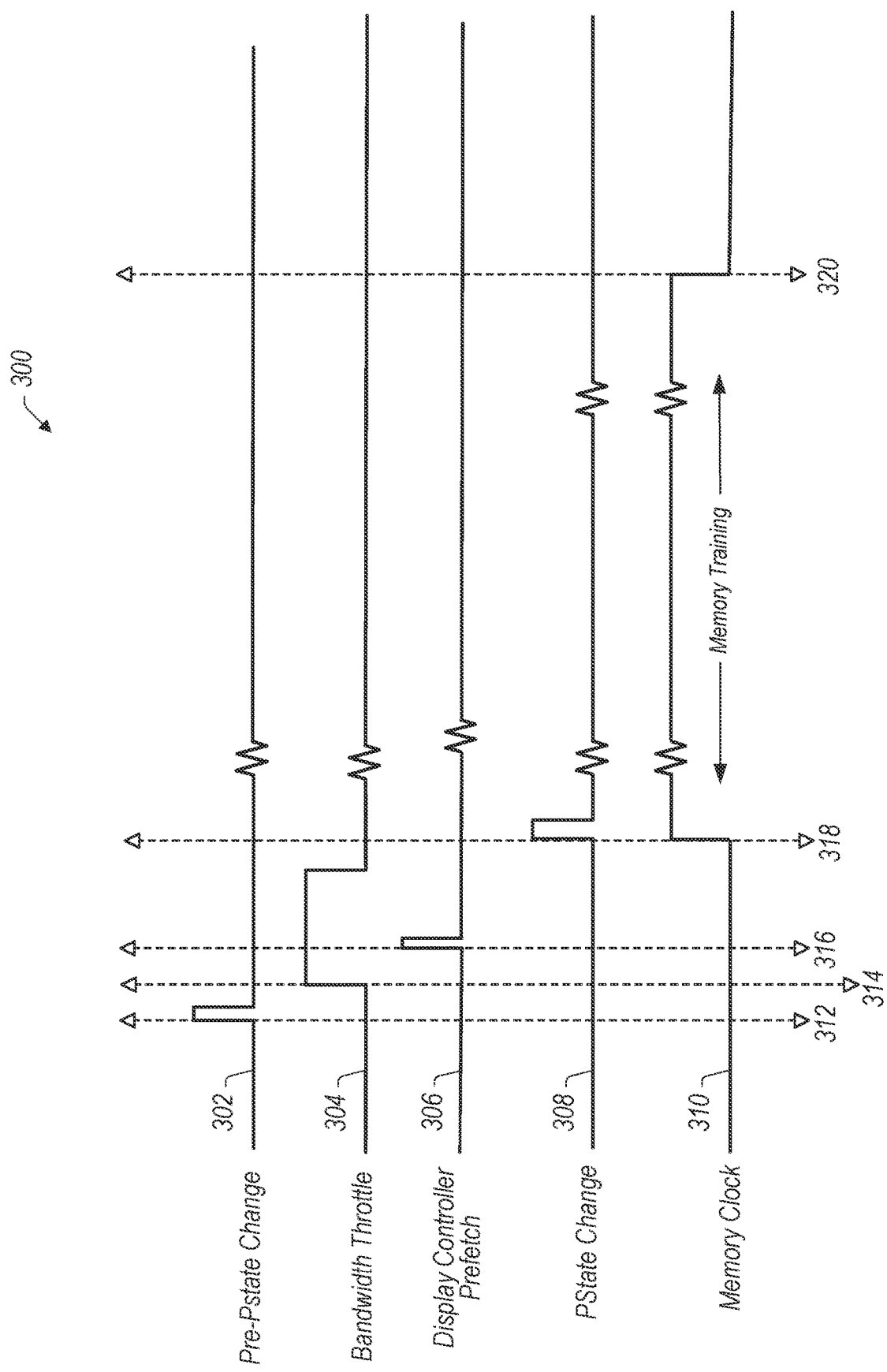
FIG. 3 is a timing diagram of one implementation of the timing of a memory clock frequency update and prefetch of display data in a computing system.

Referring now to FIG. 3, a timing diagram 300 showing waveforms of one implementation of the timing of a memory clock frequency update for a multi-display system is shown. In the example shown, signals are generated that enable a display controller to have temporarily increased memory bandwidth in advance of a Pstate change to a memory device. As shown, FIG. 3 illustrates a pre-Pstate change signal that is generated when it has been determined that a memory Pstate change is to occur. Such a determination may be made by a control circuit (e.g., 160 or 210) that includes power management circuitry.

At time 312, a pre-Pstate change 302 signal is indicated. It is noted that while the discussion describes various signals and indications as being "asserted" and/or "conveyed", such assertion/conveyance takes a variety of forms depending on the implementation. For example, in some implementations, assertion of a signal is implemented by causes the signal to attain a particular value or voltage level. In other implementations, assertion of a signal or indication is performed by writing a particular value(s) to a register or memory location. All such implementations are possible and are contemplated. In various implementations, this may be a signal asserted by the controller. In response to detecting the signal 302, one or more bandwidth throttle signals 304 are generated at a time 314. In another implementation, bandwidth throttle could also be asserted by the control circuit directly before initiating a pre-Pstate change. The amount of time that elapses between the assertion of signal 302 and signal 304 varies depending on the implementation. The bandwidth throttle signal (e.g., signal 114 in FIG. 1) is conveyed to one or more circuits that are configured to generate memory accesses. In various implementations, bandwidth reduction circuitry corresponding to a circuit, such as bandwidth regulation 112 in FIG. 1, detects the bandwidth throttle signal and causes the corresponding memory access generating device to temporarily reduce the rate at which memory accesses are generated. In some implementations, all memory accesses generated by the corresponding circuit temporarily cease (i.e., the rate goes to zero). In other implementations, the rate is reduced or otherwise limited, but does not go to zero. In such an implementation, the device is permitted to generate memory accesses, but the rate is capped or otherwise reduced. The duration of the reduction (or "throttle") varies depending on the implementation. In some implementations, the duration is for a fixed amount of time (which may be programmable) after which the memory access generation is no longer limited. In other implementations, the duration lasts for a period of time that is determined based on a further signal indicating the prefetch has been completed. Various such implementations are possible and are contemplated.

Subsequent to assertion of the bandwidth throttle signal 304, a prefetch signal 306 is conveyed by the control circuit (e.g., control circuit 160, control circuit 210) to the display controller at time 316. In some implementations, the prefetch signal 306 may be conveyed simultaneous with assertion of the bandwidth throttle signal 304. In other implementations, there is a delay between assertion of signal 304 and signal 306. Responsive to assertion of the prefetch signal 306, the display controller (e.g., 150, 240) initiates a prefetch of data from memory. As discussed above, during the prefetch of data from memory, other memory access generating clients have their memory bandwidth temporarily reduced to ensure the display controller has a desired increase in bandwidth. In this manner, a desired quality of service (QoS) of the data being displayed can be maintained. After the display controller completes its access of memory, the bandwidth throttle 304 is de-asserted and the control circuit then causes a Pstate change for the memory. In the example shown, the controller asserts a Pstate change signal 308 at time 318. In various implementations, the control circuit (160, 210) also conveys or stores an indication as to the new Pstate, and clock frequency, to which the memory is to transition. Responsive to the Pstate change signal 308 at time 318, the memory subsystem enters the above discussed training period. As noted, many memory devices (e.g., graphics double data rate (GDDR) synchronous dynamic random-access memory (SDRAM) devices) require memory training when a memory clock frequency is changed. For these memory devices, memory training is performed as part of the memory clock frequency change. After a period of time, the memory training is completed at a time 320 and the memory (subsystem) achieves a stable state at the new Pstate. At this time, accesses to the memory are no longer block (i.e., the memory blackout period ends).

Figure 4:
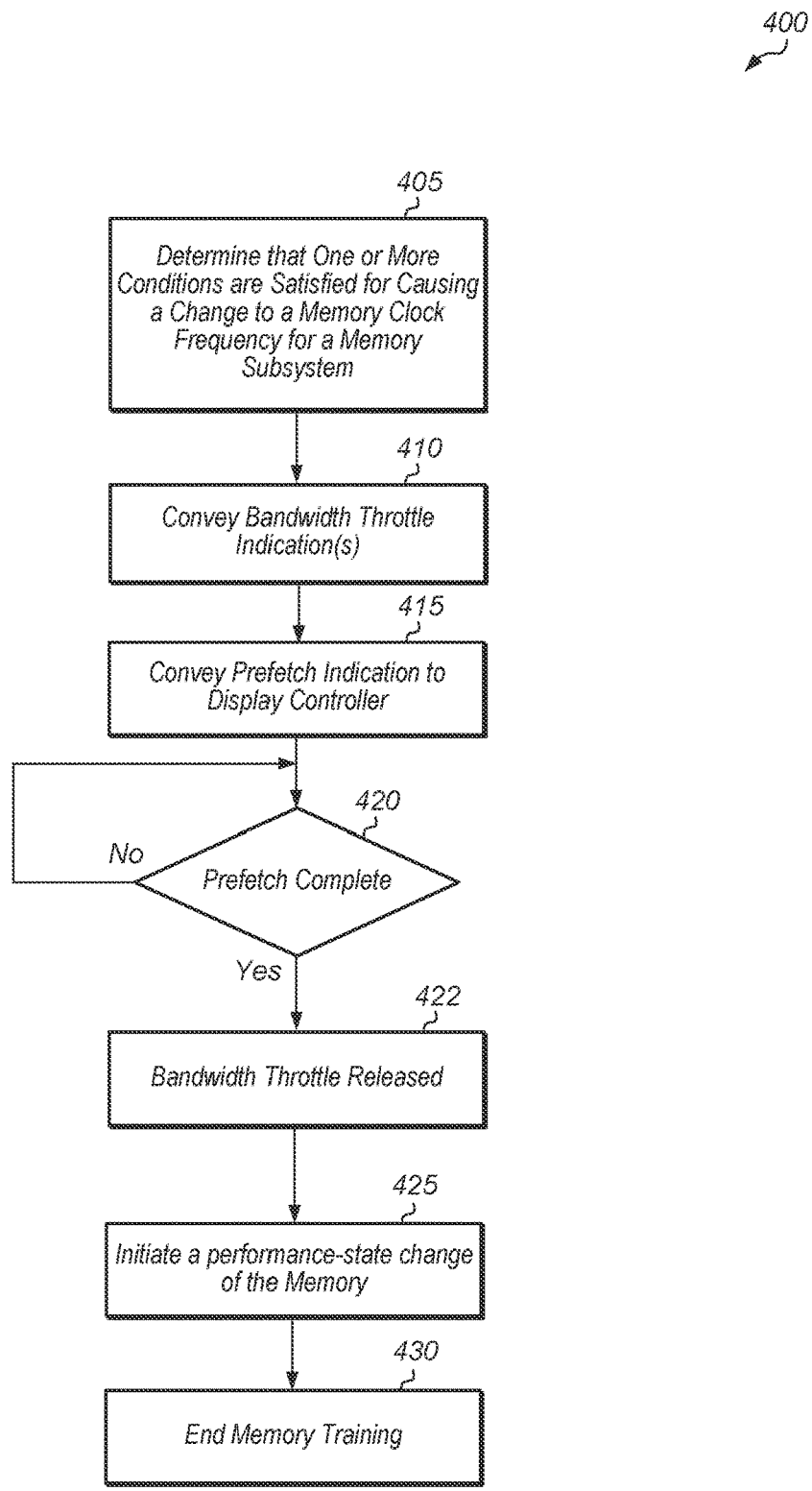
FIG. 4 is method for performing a prefetch of display data in advance of a performance-state change of a memory storing display data.

Referring now to FIG. 4, one implementation of a method 500 for performing a display controller prefetch in advance of memory clock frequency changes is shown. For purposes of discussion, the steps in this implementation are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

In the implementation of FIG. 4, a control circuit (such as control circuit 160 in FIG. 1 or control circuit 210 in FIG. 2) determines that one or more conditions are satisfied for causing a change to a memory clock frequency for a memory subsystem (block 405). As one example, an increase or decrease in required memory bandwidth may be detected based on tasks being executed (or tasks queued for execution), thermal conditions, or otherwise. For example, if an increase in memory accesses is detected, the memory clock frequency can be increased in order to increase that rate at which memory accesses can be completed. Conversely, if a reduced number of memory accesses is detected, the memory clock frequency can be reduced in order to reduce power consumption. Numerous such examples are possible and are contemplated. Responsive to detecting the condition, a signal may be asserted (e.g., signal 302 of FIG. 3) that causes one or more bandwidth reduction circuits 112 to temporarily reduce memory bandwidth of a corresponding client. In various implementations, such a reduction may be implemented by preventing selection of one or more pending memory accesses for servicing. For example, in some implementations, a client is configured to store generated memory accesses in a queue or other location (e.g., an outgoing or pending queue) where they are then selected and conveyed to the memory subsystem for servicing. In some implementations, the bandwidth reduction is accomplished by causing the corresponding client to temporarily cease or slow generation of memory accesses by a client. In one implementation, the change to the memory clock frequency for the memory subsystem is performed as part of a power-state change. The one or more conditions that trigger the change to the memory clock frequency can vary from implementation to implementation. For example, the condition may be triggered in response to detecting an increased memory bandwidth requirement. For example, tasks corresponding to a particular type of application may have an increased need for bandwidth. In response, an increase in the Pstate of the memory is indicated. As another example, one or more processing circuits in the computing system are detected to be in an idle condition or otherwise have a reduced need for memory bandwidth. In response, a reduction in a Pstate of the memory is initiated to reduce power consumption of the system. Other conditions can cause a memory clock frequency change in other implementations. For example, in one implementation, connecting or disconnecting alternating current (AC) power or direct current (DC) power can cause a memory clock frequency change. There may be different allowable clock ranges depending on the power source. In another implementation, a change in the temperature of the host system or apparatus can trigger a desired to change the memory clock frequency. For example, if the temperature of the host system/apparatus exceeds a first threshold, then the control circuit will attempt to reduce power consumption in order to lower the temperature. One of the ways for reducing the power consumption is by decreasing the memory clock frequency. In a further implementation, if the temperature falls below a second threshold, the control circuit can increase the memory clock frequency since doing so will not cause the system/apparatus to overheat. In a still further implementation, if there is a requested performance increase, or a performance increase is otherwise deemed to be desirable (e.g., to increase computation speed, frame rate of a video display, or otherwise), then the control circuit will attempt to increase performance by increasing the memory clock frequency. Other conditions for changing the memory clock frequency are possible and are contemplated.

In some implementations, the condition for triggering a change to the memory clock frequency can be event driven. For example, in various implementations the memory controller posts events related to throughput when the throughput goes over or under some threshold. Such events can be monitored during programmable windows of time or otherwise filtered temporally in some way. There can also be software, firmware, or hardware-based mechanism that when a workload is submitted, the mechanism knows or predicts that the workload will need resources before the workload is scheduled or executed. Similarly, when the workload finishes, the mechanism knows what resources are no longer needed (i.e., the workload in question has completed and no longer needs a resource). Also, a similar mechanism can account for periodic workloads. In another implementation, a real-time operating system (RTOS) may be aware of deadlines, and the RTOS can pick more optimal clocks depending on an approaching deadline.

In response to detecting the condition(s) for causing a change to the memory clock frequency (405), the control circuit generates a bandwidth throttle signal which is then detected by one or more bandwidth reduction circuits in the computing system. As discussed above, detection of the bandwidth reduction signal causes one or more devices in the computing system to reduce its rate of memory accesses conveyed to the memory system. The control circuit then generates 415, or otherwise conveys, a prefetch signal (e.g., such as signal 247 in FIG. 2). In response to detection of the prefetch signal, the display controller initiates prefetch of display data from the memory subsystem. Subsequent to completion (420) of the prefetch of data by the display controller, the control circuit (160, 210) initiates or otherwise causes a change in Pstate to the memory. In various implementations, completion of the prefetch (420) is determined based on the elapse of a given period of time (which may be programmable). In other implementations, the display controller may convey an indication that the prefetch is completed. In such an implementation, the display controller may convey the indication in response to receiving the prefetch data or otherwise determining the prefetch of the data from the memory is complete and is in transit to the display controller. In other words, further accesses to the memory are not believed needed even though all of the prefetched data hasn't yet reached the display controller. These and other implementations are possible and are contemplated.

Responsive to completion of the prefetch of data by the display controller, the bandwidth throttle is released 422 (i.e., the bandwidth throttle ceases) and the control circuit initiates a Pstate change of the memory. In various implementation, the Pstate change includes changing the memory clock frequency (block 425). In one implementation, as part of the memory clock frequency update, memory training is performed. After the memory clock frequency update and training is completed (430), memory accesses can again be performed. In some implementations, the control circuit (e.g., 160, 210) conveys a signal to the bandwidth reduction circuits (112) that causes them to discontinue memory bandwidth throttling of the corresponding devices. In other implementations, the bandwidth throttle lasts for a given period of time as discussed above. It is noted that method 400 can be repeated each time conditions(s) for changing the memory clock frequency are detected.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware, Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a control circuit, wherein responsive to determining that a condition for changing a performance state of a memory subsystem is satisfied, the control circuit is configured to:
cause a reduction in memory bandwidth of a client configured to generate memory accesses to the memory subsystem; and
cause a display controller to prefetch display data from the memory subsystem, during a period of time that the client has its memory bandwidth reduced.

2. The apparatus as recited in claim 1, wherein to cause the reduction in memory bandwidth, the control circuit is configured to convey an indication to a bandwidth regulation circuit corresponding to the client.

3. The apparatus as recited in claim 1, wherein subsequent to the prefetch, the control circuit is configured to cause the memory subsystem to enter a training period.

4. The apparatus as recited in claim 3, wherein during the training period, accesses to the memory subsystem are blocked.

5. The apparatus as recited in claim 4, wherein subsequent to completion of the training period, the reduction in memory bandwidth ceases.

6. The apparatus as recited in claim 1, wherein determining the condition for changing a performance state of the memory subsystem is satisfied comprises one or more of detecting an idle condition of a client, detecting an increased memory bandwidth requirement of a client, detecting a change in temperature, determining a memory bandwidth demand differs by more than a threshold from memory bandwidth available with a current memory clock frequency, or detecting a requested performance increase.

7. The apparatus as recited in claim 1, wherein the control circuit is configured to cause the display controller to prefetch the display data by conveying a signal to the display controller.

8. The apparatus as recited in claim 1, wherein subsequent to the display controller prefetching the data, the reduction in the memory bandwidth ceases.

9. A method comprising:
responsive to a condition for changing a performance state of a memory subsystem being satisfied:
causing a reduction in memory bandwidth of a client configured to generate memory accesses to the memory subsystem; and
causing a display controller to prefetch display data from the memory subsystem, during a period of time that the client has its memory bandwidth reduced.

10. The method as recited in claim 9, wherein to cause the reduction in memory bandwidth, the method comprises conveying an indication to a bandwidth regulation circuit corresponding to the client.

11. The method as recited in claim 9, wherein subsequent to the prefetch, the method comprises causing the memory subsystem to enter a training period.

12. The method as recited in claim 11, wherein during the training period, accesses to the memory subsystem are blocked.

13. The method as recited in claim 12, wherein subsequent to completion of the training period, the reduction in memory bandwidth ceases.

14. The method as recited in claim 9, wherein determining the condition for changing a performance state of the memory subsystem is satisfied comprises one or more of detecting an idle condition of a client, detecting an increased memory bandwidth requirement of a client, detecting a change in temperature, determining a memory bandwidth demand differs by more than a threshold from memory bandwidth available with a current memory clock frequency, or detecting a requested performance increase.

15. The method as recited in claim 9, further comprising causing the display controller to prefetch the display data by conveying a signal to the display controller.

16. The method as recited in claim 9, wherein subsequent to the display controller prefetching the data, the reduction in memory bandwidth ceases.

17. A system comprising:
a memory subsystem;
one or more clients configured to generate memory accesses to the memory subsystem; and
a display controller;
a control circuit, wherein responsive to determining that a condition for changing a performance state of the memory subsystem is satisfied, the control circuit is configured to:
cause a reduction in memory bandwidth of one or more of the clients; and
cause the display controller to prefetch display data from the memory subsystem, during a period of time that the client has its memory bandwidth reduced.

18. The system as recited in claim 17, wherein the system further comprises bandwidth reduction circuitry corresponding to the one or more clients, and the control circuit is configured to cause the reduction in memory bandwidth of the one or more of the clients by conveying an indication to the bandwidth reduction circuitry.

19. The system as recited in claim 18, wherein subsequent to the prefetch of display data by the display controller, the control circuit is configured to cause the memory subsystem to enter a training period.

20. The system as recited in claim 19, wherein during the training period, accesses to the memory subsystem are blocked.

* * * * *